US010513079B2

(12) United States Patent
Bonte et al.

(10) Patent No.: US 10,513,079 B2
(45) Date of Patent: Dec. 24, 2019

(54) SEALING DIE WITH CHAMFERED EDGE

(71) Applicants: Baxter International Inc., Deerfield, IL (US); Baxter Healthcare SA, Glattpark (Opfikon) (CH)

(72) Inventors: Jean-Claude Bonte, Lessines (BE); Keith Anderson, Libertyville, IL (US); Doug Weaver, Libertyville, IL (US); Tony Ciganek, Barrington, IL (US)

(73) Assignees: Baxter International Inc., Deerfield, IL (US); Baxter Healthcare SA, Glattpark (Opfikon) (CH)

( * ) Notice: Subject to any disclaimer, the term of this patent is extended or adjusted under 35 U.S.C. 154(b) by 192 days.

(21) Appl. No.: 15/789,244

(22) Filed: Oct. 20, 2017

(65) Prior Publication Data

US 2018/0111331 A1    Apr. 26, 2018

Related U.S. Application Data

(60) Provisional application No. 62/410,759, filed on Oct. 20, 2016.

(51) Int. Cl.
*B29C 65/04* (2006.01)
*B29C 65/00* (2006.01)
(Continued)

(52) U.S. Cl.
CPC ........ *B29C 66/81411* (2013.01); *B29C 65/02* (2013.01); *B29C 65/04* (2013.01);
(Continued)

(58) Field of Classification Search
CPC ... B29C 66/81411; B29C 65/04; B29C 66/43; B29C 66/8511; B29C 65/7891;
(Continued)

(56) References Cited

U.S. PATENT DOCUMENTS 2,920,172 A    1/1960   Stallard
4,451,721 A    5/1984   Nemeskeri
(Continued)

FOREIGN PATENT DOCUMENTS

DE    3911634 A1    10/1990
DE    19752917 A1    6/1999
(Continued)

OTHER PUBLICATIONS

Communication pursuant to Rules 161(1) and 162 EPC dated May 28, 2019 in related EP Application No. 17794535.9; (3 Pages).
(Continued)

*Primary Examiner* — Michael C Miggins
(74) *Attorney, Agent, or Firm* — K&L Gates LLP

(57) ABSTRACT

A welding apparatus for use in welding first and second sheets of material together includes a seal die, a platen, a control unit, and a power source adapted to provide energy to the seal die. The seal die is made of a conductive material and is configured to impart thermal-mechanical energy to the first and second sheets of material. The seal die includes a bottom surface configured to contact the first sheet, an inner edge, a chamfer extending between the bottom surface and the inner edge, a first blend radius, and a second blend radius. The first radius extends between the chamfer and the bottom surface, while the second radius extends between the chamfer and the inner edge. The platen is configured to support the second sheet, while the control unit is programmed to cause the seal die to be directed towards the platen.

28 Claims, 10 Drawing Sheets

(51) Int. Cl.
*B65D 75/58* (2006.01)
*B29C 65/78* (2006.01)
*B29C 65/02* (2006.01)
*B29L 31/00* (2006.01)
*B29C 65/18* (2006.01)

(52) U.S. Cl.
CPC ...... *B29C 65/7891* (2013.01); *B29C 66/1122* (2013.01); *B29C 66/244* (2013.01); *B29C 66/3472* (2013.01); *B29C 66/43* (2013.01); *B29C 66/73921* (2013.01); *B29C 66/81419* (2013.01); *B29C 66/8322* (2013.01); *B29C 66/83221* (2013.01); *B29C 66/8511* (2013.01); *B65D 75/5805* (2013.01); *B29C 65/18* (2013.01); *B29C 66/71* (2013.01); *B29C 66/8222* (2013.01); *B29C 66/8223* (2013.01); *B29C 66/8242* (2013.01); *B29L 2031/7128* (2013.01)

(58) Field of Classification Search
CPC ............... B29C 66/1122; B29C 66/244; B29C 66/3472; B29C 66/73921; B29C 66/81419; B29C 66/8322; B29C 66/83221; B29C 65/02; B29C 65/18; B29C 66/71; B29C 66/8222; B29C 66/8223; B29C 66/8242; B65D 75/5805; B29L 2031/7128
See application file for complete search history.

(56) References Cited

U.S. PATENT DOCUMENTS

| | | | |
|---|---|---|---|
| 4,496,046 | A | 1/1985 | Stone et al. |
| 5,026,339 | A | 6/1991 | Kasper |
| 6,086,524 | A | 7/2000 | Martin |
| 6,276,114 | B1 | 8/2001 | Hayashi |
| 7,003,934 | B1 | 2/2006 | Yano |
| 7,204,289 | B2 | 4/2007 | Hickman et al. |
| 7,448,184 | B2 | 11/2008 | Clark et al. |
| 8,092,631 | B2 | 1/2012 | Germain et al. |
| 2007/0045240 | A1 | 3/2007 | Smith et al. |
| 2009/0113851 | A1 | 5/2009 | Carr et al. |

FOREIGN PATENT DOCUMENTS

| | | |
|---|---|---|
| DE | 10005020 A1 | 8/2001 |
| DE | 10019288 A1 | 10/2001 |
| EP | 0 546 502 A2 | 6/1993 |
| GB | 2475886 A | 6/2011 |
| JP | S63106440 U | 7/1988 |
| JP | 3291280 B2 | 6/2002 |
| WO | 2016079702 A1 | 5/2016 |

OTHER PUBLICATIONS

International Search Report and Written Opinion dated Jan. 31, 2018 in related PCT Application Serial No. PCT/US2017/057635; (18 Pages).

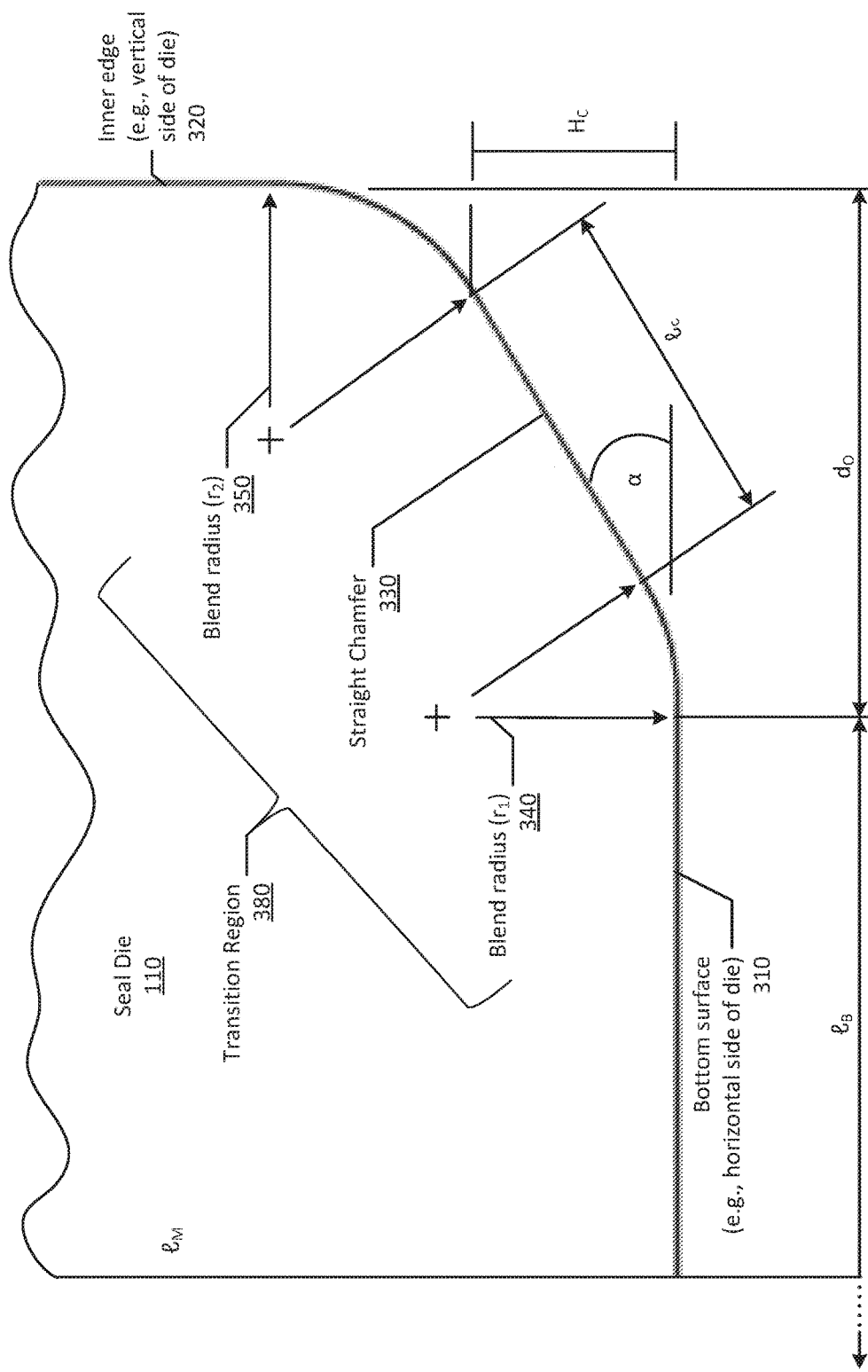

SEALING DIE WITH CHAMFERED EDGE

PRIORITY CLAIM

This application claims priority to U.S. Provisional Application No. 62/410,759, entitled "Radio Frequency Chamfer Die", filed Oct. 20, 2016, the entire contents of which is incorporated herein by reference and relied upon.

BACKGROUND

Material sheets or plies may be welded together using radio frequency sealing dies or heat sealing dies. U.S. Pat. No. 8,092,631 broadly teaches using a beveled edge (e.g., chamfer) on high frequency welding dies. U.S. Publication No. 2009/0113851 teaches a seal plate with a radius on the bottom surface to create a curved profile and a chamfered edge. International Publication No. WO 2016/079702 teaches a radio frequency welding electrode with rounded sides.

Unfortunately, seal dies with chamfered edges may result in electric field concentrations at the edges of the chamfer that negatively affect seal quality. Rounded seal die profiles (e.g., with a rounded edge or radius) require a large radius to approximate linear compression between the sheets used to form a bag, which may necessitate large, heavy, expensive and less efficient RF electrode design. Additionally, rounded seal dies may reduce the amount of molten material that remains under compression beneath the rounded portion of the seal die, which may result in less cohesion between the plies of material. Further, rounded seal dies may result in a smaller bead mass, which increases the risk for stress risers due to malformed beads.

An improved die for sealing material sheets or plies is needed accordingly.

SUMMARY

The present disclosure provides improved welding apparatuses (e.g., radio frequency welding apparatuses and heat welding apparatuses) and seal dies (e.g., radio frequency seal dies and heat seal dies). In one example embodiment, a radio frequency welding apparatus for use in welding first and second sheets of material together to form a bag includes a seal die, a platen, a control unit, and a power source. The seal die is made of a conductive material and is configured to impart thermal-mechanical energy to the first and second sheets of material. The seal die includes a bottom surface, an inner edge, a straight chamfer, a first blend radius, and a second blend radius. The bottom surface is configured to contact the first sheet of material. The straight chamfer extends between the bottom surface and the inner edge.

Additionally, the straight chamfer has an orientation angle with respect to the bottom surface. The first blend radius is positioned between the straight chamfer and the bottom surface, while the second blend radius is positioned between the straight chamfer and the inner edge. The straight chamfer, the first blend radius, and the second blend radius form a transition region.

The platen is configured to support the second sheet of material, while a control unit is configured to direct the seal die towards the platen, such that the seal die compresses the first sheet of material and the second sheet of material together between the seal die and the platen. The control unit controls the power source, which is adapted to provide energy to the seal die, such that the seal die imparts thermal energy welding the first and second sheets of material together.

In another example embodiment, an electrically conductive radio frequency seal die for use in an apparatus for welding first and second sheets of material together includes a bottom surface, an inner edge, a straight chamfer, a first blend radius, and a second blend radius. The bottom surface is configured to contact the first sheet of material. The straight chamfer is positioned between the bottom surface and the inner edge. The straight chamfer has a length and forms an angle with respect to the bottom surface. The first blend radius is located between the straight chamfer and the bottom surface. The second blend radius is located between the straight chamfer and the inner edge. The straight chamfer, the first blend radius, and the second blend radius form a transition region.

In one embodiment, the first blend radius and the second blend radius are at least 45 percent of the length of the chamfer.

In another embodiment, the chamfer is angled at least 25 degrees with respect to the bottom surface of the die.

In a further embodiment, the inner edge of the die is offset from the bottom surface of the die by 1.0 mm (0.0394 inches).

In other example embodiments, the first blend radius and the second blend radius are at least 0.5 mm (0.0197 inches).

In another example embodiment, a structure formed via first and second sheets of material welded together via a method includes positioning the first sheet of material over the second sheet of material. The second sheet of material is supported by a platen. The method further includes causing a seal die to be directed via automated motion towards the platen, causing via automated motion, the first and second sheets of material to be compressed together between the seal die and the platen, and providing energy to the seal die such that the seal die imparts thermal energy welding the first and second sheets of material together.

In another example embodiment, a structure formed via first and second sheets of material welded together via a method includes positioning the first sheet of material over the second sheet of material, directing a seal die towards a platen, compressing the first and second sheets of material together to create a seal gap between the seal die an the platen, and energizing the seal die to impart thermal energy to the first and second sheets of material within the seal gap.

In one embodiment, the structure is a bag.

It is accordingly an advantage of the present disclosure to reduce bag defects due to film thickness variations.

It is another advantage of the present disclosure to reduce bag defects due to imperfect film profiles.

It is a further advantage of the present disclosure to reduce bag defects due to excessive or insufficient compression or heating of the plies (e.g., sheets of material).

It is yet a further advantage of the present disclosure to reduce mechanical stress concentrations at the ply interface due to an absence of an air gap between the plies.

It is yet another advantage of the present disclosure to suppress electrical field concentrations in the die.

It is still a further advantage of the present disclosure to prevent an antenna effect within the seal die.

It is still another advantage of the present disclosure to provide strain relief to the top ply and reduce mechanical shear at the die's edge.

Moreover, a further advantage of the present disclosure to provide a more gradual mechanical property or polymeric property change between the seal zone and the unsealed film, which may reduce the occurrence of mechanical stress risers.

It is still another advantage of the present disclosure to provide a more gradual decrease of seal bead extrusion speed and seal bead pressure, which may improve bead sealing to the sheets of material (e.g., upper sheet).

Additional features and advantages of the disclosed welding apparatus and seal die are described in, and will be apparent from, the following Detailed Description and the Figures. The features and advantages described herein are not all-inclusive and, in particular, many additional features and advantages will be apparent to one of ordinary skill in the art in view of the figures and description. Also, any particular embodiment does not have to have all of the advantages listed herein. Moreover, it should be noted that the language used in the specification has been principally selected for readability and instructional purposes, and not to limit the scope of the inventive subject matter.

BRIEF DESCRIPTION OF THE FIGURES

FIG. 3A is a side elevation cross-sectional view taken along line III-III of FIG. 2A showing an embodiment of a seal die according to the present disclosure.

DETAILED DESCRIPTION OF EXAMPLE EMBODIMENTS

As discussed above, an improved seal die and welding apparatus is provided to reduce imperfections and seal defects in bags. Seal defects are problematic because they increase costs associated with scrap materials and may require extensive detection checkpoints. Seal defects may result in bags that will fail under normal handling and/or may result in products with a reduced shelf life due to unexpected failure. The sealing apparatus and sealing die discussed herein reduce seal defects in bags and provide a sealing die that can be used for a broader range of applications and that is more independent of film thickness and seal thickness variations.

The seal die (e.g., radio frequency ("RF") seal die or heat seal die) impinges two plies of material during the sealing process, imparting thermal-mechanical energy to form a seal between first and second sheets of material. As the RF seal die is energized with RF energy, the first and second sheets of material are heated and welded together in the regions in contact with the seal die. Similarly, the heat seal die is heated to transmit thermal energy to and weld first and second sheets of material together. The seal die is raised away from the platen and the sealed sheets are moved along for further processing (e.g., cutting) while a new unsealed section of the sheets are positioned between the seal die and the platen.

Figure 1A:
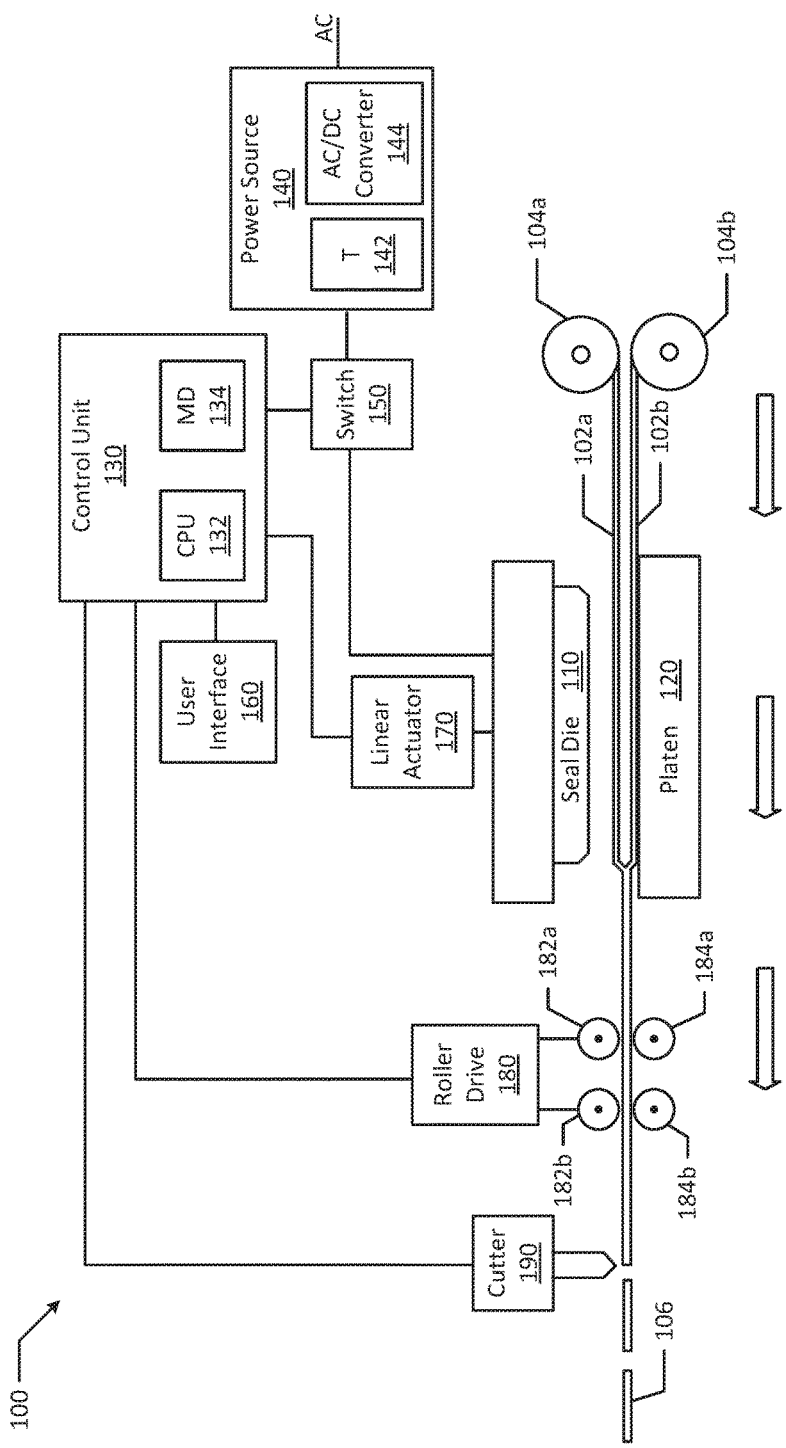
FIGS. 1A and 1B are schematic views of a welding apparatus according to an example embodiment of the present disclosure.

Referring to the drawings and in particular to FIG. 1A, in one embodiment, a welding apparatus 100 of the present disclosure is provided to weld first and second sheets of material (e.g., first sheet 102a and second sheet 102b, hereinafter sheets 102) together. In one embodiment, the welding apparatus 100 includes a seal die 110a, a platen 120, a control unit 130, and a power source 140. Control unit 130 may include one or more processor (e.g., CPU 132) and one or more memory (e.g., memory device 134).

It should be appreciated that platen 120 may be replaced by a bottom seal die. For example, the welding apparatus 100 may weld sheets 102 together using a top seal die (e.g., seal die 110a) and a bottom seal die as explained further below with reference to FIG. 1C.

Figure 1B:
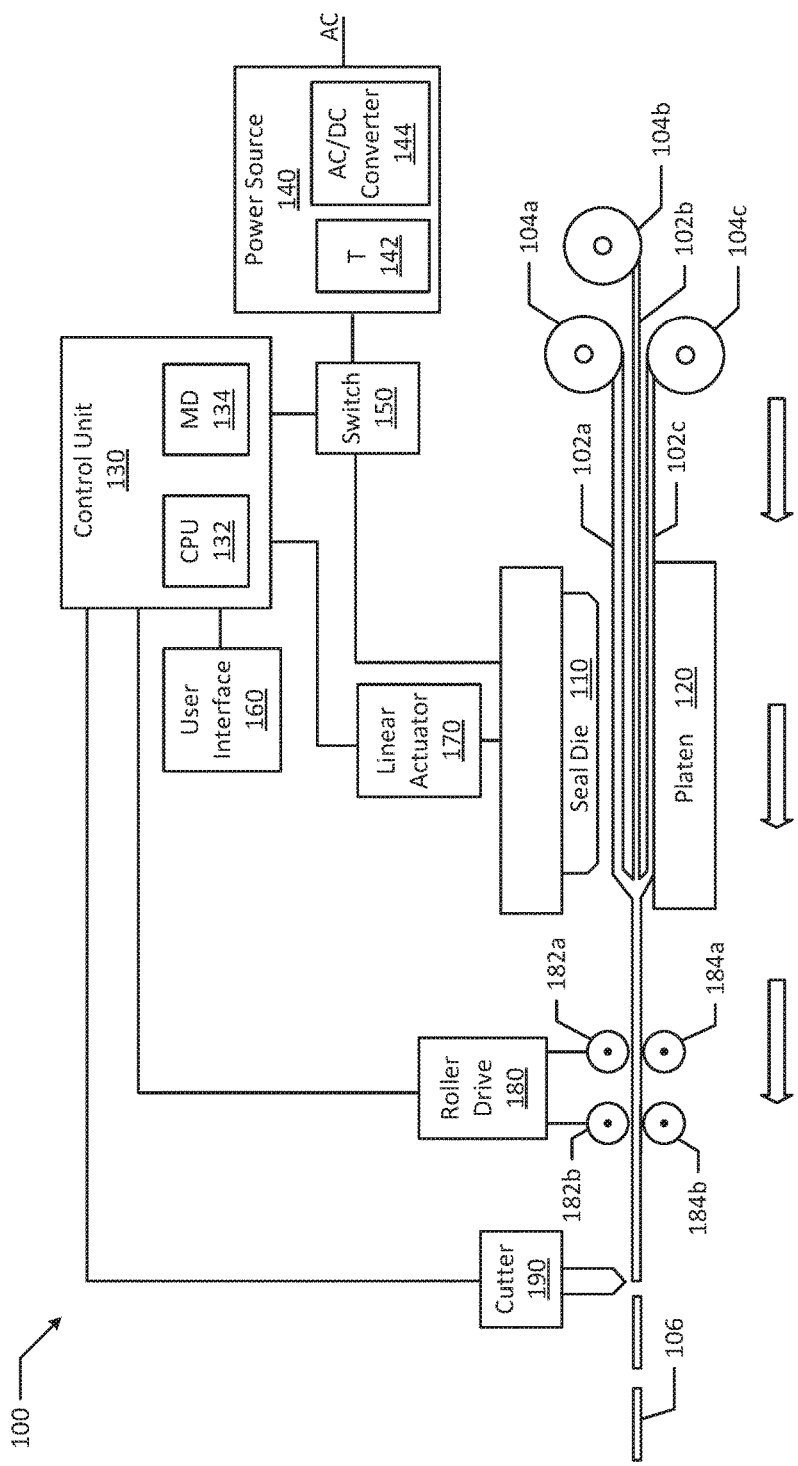

In another example embodiment illustrated in FIG. 1B, the seal die may impinge three plies of material during the sealing process. For example, three or more sheets of material may be used for a multi-chamber bag. Additionally, a third ply (e.g., third sheet 102c) may be used between second sheet 102b and the platen 120 as a buffer material, discussed in more detail below. The third ply (e.g., third sheet 102c) may introduce additional points of variation to improve robustness of resulting bags.

As used herein, the term, "processor" may refer to a device capable of executing instructions encoding arithmetic, logical, and/or I/O operations. In one illustrative example, a processor may follow Von Neumann architectural model and may include an arithmetic logic unit ("ALU"), a control unit, and a plurality of registers. In a further aspect, a processor may be a single core processor which is typically capable of executing one instruction at a time (or process a single pipeline of instructions), or a multi-core processor which may simultaneously execute multiple instructions. In another aspect, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit (CPU).

As used herein, the term, "memory" may refer to a volatile or non-volatile memory device, such as RAM, ROM, EEPROM, or any other device capable of storing data.

Power source 140 may be adapted to provide energy (e.g., RF energy) to the seal die 110a (hereinafter seal die 110), such that the seal die 110 imparts thermal energy to weld the first and second sheets of material 102 together. In the illustrated embodiment, power source 140 is connected to control unit 130 via a switch 150, such that the control unit 130 can selectively open and close switch 150 to direct power to the seal die 110 as desired.

In an example embodiment, power source 140 may include one or more transformer(s) (e.g., transformer 142) and/or converter(s) (e.g., AC/DC converter 144) to covert AC input power into a desired output power. Power source 140 may for example output RF energy or thermal energy to the seal die 110. In an example, the power source may have a power range between 0.5 kW to at least 30 kW. The RF energy may be supplied as an RF high-voltage (e.g., below 8 kV mean) electric field. The RF energy may have a frequency approved for Industrial, Scientific, and Medical equipment. For example, the RF energy may have a frequency of 13.56 MHz ±7.0 kHz, 27.12 MHz ±163.0 kHz, 40.68 MHz ±20.0 kHz, or other suitable frequency. In an example, the frequency may be 27.12 MHz. The higher frequency energy (e.g., RF energy) creates an RF electromagnetic field between the seal die 110 and the platen 120. It should be understood that seal die 110 is not limited to the RF processes described herein, and that seal die 110 is compatible with a broad range of RF process implementations.

As illustrated in FIG. 1A, first and second sheets or plies 102 of material are pulled over the platen 120 from first and second rolls of material (e.g., first roll of material 104a and second roll of material 104b, hereinafter rolls 104). As used herein, the term, "sheet" and "ply" may refer to a thin material or film 102 made from polyvinylchloride ("PVC"), urethane, ethylene-vinyl acetate ("EVA"), poly(ethylene-vinyl acetate) ("PEVA"), polyethylene terephthalate ("PET-G"), and other similarly RF responsive materials. Sheets 102 are positioned between the seal die 110 and platen 120 by one or more drive roller(s) (e.g., 182a, 182b, hereinafter 182) and one or more tensioning roller(s) (e.g., 184a, 184b). The one or more drive rollers 182 may be controlled by control unit 130 controlling a roller drive 180.

A linear actuator 170 under control of control unit 130 drives the seal die 110 down onto the platen 120 to compress first and second sheets 102 of material together. During compression, control unit 130 controls switch 150 and power source 140 to provide RF energy or thermal energy to the seal die 110, which melts the interface between first and second sheets 102 of material together at locations that are in contact with the seal die 110. Control unit 130 then causes linear actuator 170 to raise seal die 110 away from platen 120, after which the sealed sheets 102 are moved via the roller drive 180 and drive roller(s) 182 to a cutter 190. Cutter 190 cuts the sealed sheets 102 of material into individual bags 106 (e.g., 250 mL Dopamine and Dobutamine bags), which may be directed to another station for processing (e.g., inspection).

The seal die 110 is made of a conductive material, such as steel, stainless steel, brass, copper, aluminum, and alloys thereof. In an example embodiment, the conductive material imparts thermal-mechanical energy to first and second sheets 102 of material. In an example embodiment, the seal die 110 is formed with a shape associated with a bag geometry. Seal die 110 is sized to produce a desired bag shape for a target fluid volume.

As illustrated in FIG. 1A, platen 120 supports the first and second sheets 102 of material. Platen 120 is, in one embodiment, a solid, flat, metallic surface that serves as a ground for the RF energy that passes from the seal die 110 through the first and second sheets 102 of material.

Control unit 130 may be programmed with multiple selectable programs to cause the seal die 110 to be directed towards the platen 120, such that the seal die 110 compresses the first and second sheets 102 of material together between the seal die 110 and the platen 120 in a desired manner. Control unit 130 may provide user interface 160 to program and/or select a control program at control unit 130. For example, a user may use the user interface 160 (e.g., via touchscreen or membrane switch) to program or select a program of operating conditions for the sealing apparatus 100 (e.g., specifying any one or more of amount of RF energy or thermal energy applied, compressive force to apply via linear actuator 170, length of time for sealing process, etc.). User interface 160 may also include a display screen that displays operating parameters of the welding apparatus 100.

In various embodiments, the linear actuator 170 may be pneumatically, hydraulically, or electromechanically driven. Linear actuator 170 may for example include a motor that drives seal die 110 using a pinion arrangement or a worm gear and lead screw.

As illustrated in FIG. 1B, platen 120 supports the first, second, and third sheets 102 of material. Power source 140 may be adapted to provide energy (e.g., RF energy or thermal energy) to seal die 110b (hereinafter seal die 110), such that the seal die 110 imparts thermal energy to weld the first, second, and third sheets of material 102 together.

As illustrated in FIG. 1B, first, second, and third sheets or plies 102 of material are pulled over the platen 120 from first, second, and third rolls of material (e.g., first roll of material 104a, second roll of material 104b, and third roll of material 104c hereinafter rolls 104). Sheets 102 are positioned between the seal die 110 and platen 120 by one or more drive roller(s) (e.g., 182a, 182b) and one or more tensioning roller(s) (e.g., 184a, 184b). The one or more drive rollers 182 may be controlled by control unit 130 controlling a roller drive 180.

Figure 1C:
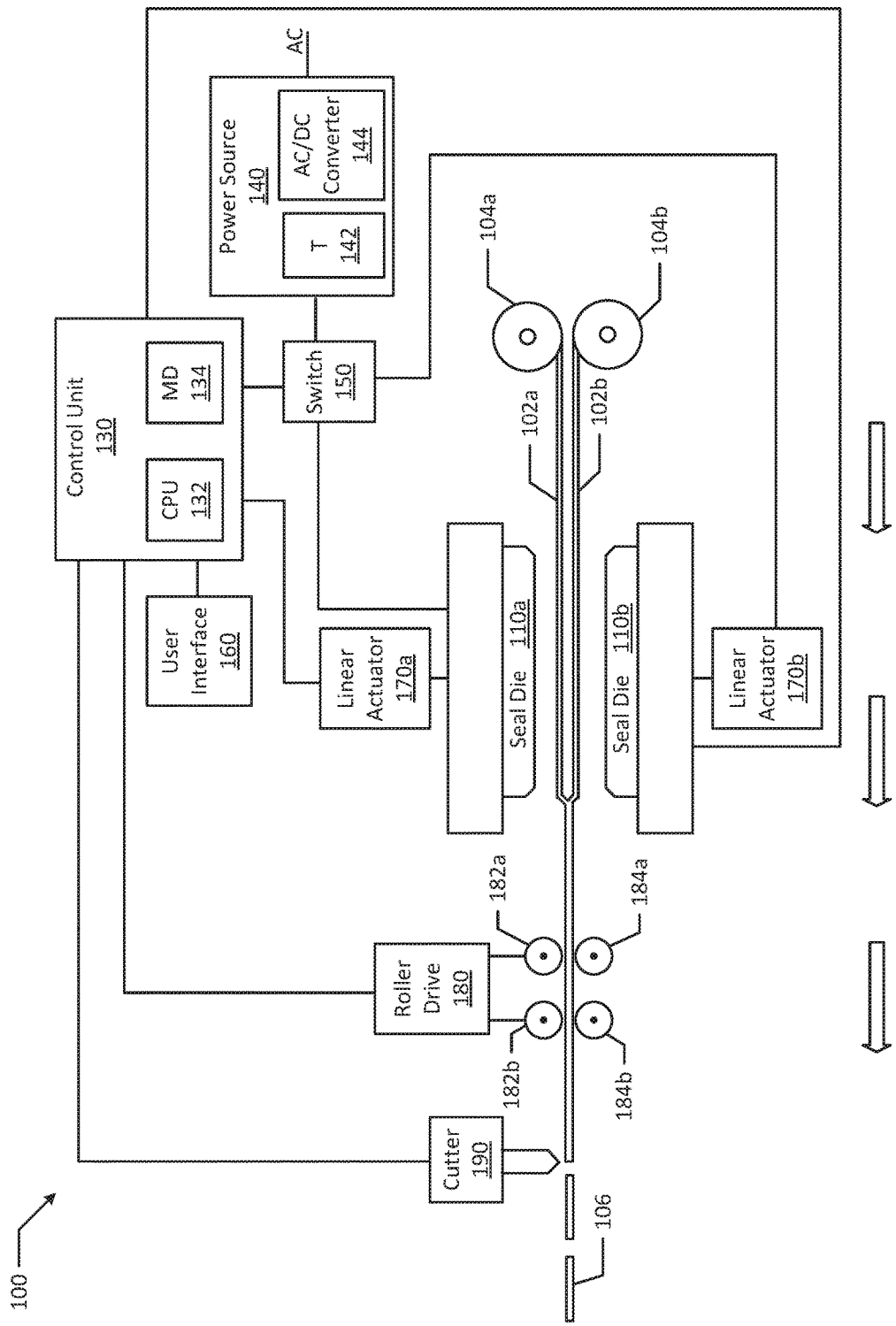
FIG. 1C is a schematic view of a welding apparatus according to an example embodiment of the present disclosure.

As illustrated in FIG. 1C, the platen 120 may be replaced by a matching seal die 110b. Linear actuators 170a and 170b under control of control unit 130 drive seal die 110a and seal die 110b towards each other to compress first and second sheets 102 of material together. During compression, control unit 130 controls switch 150 and power source 140 to provide RF energy or thermal energy to the seal die 110a and seal die 110b, which melts the first and second sheets 102 of material together at locations that are in contact with each seal die (e.g., seal die 110a,b). Control unit 130 then causes linear actuators 170a and 170b to retract seal dies 110a and 110b away from each other, after which the sealed sheets 102 are moved via the roller drive 180 and drive roller(s) 182 to a cutter 190. Cutter 190 cuts the sealed sheets 102 of material into individual bags 106, which may be directed to another station for processing (e.g., inspection). Seal die 110a and seal die 110b may be controlled by the same switch (e.g., switch 150). In another example embodiment, seal die 110b may be controlled by a separate switch such that seal die 110a and seal die 110b are independently controlled. Seal die 110b may match seal die 110a.

Figure 2B:
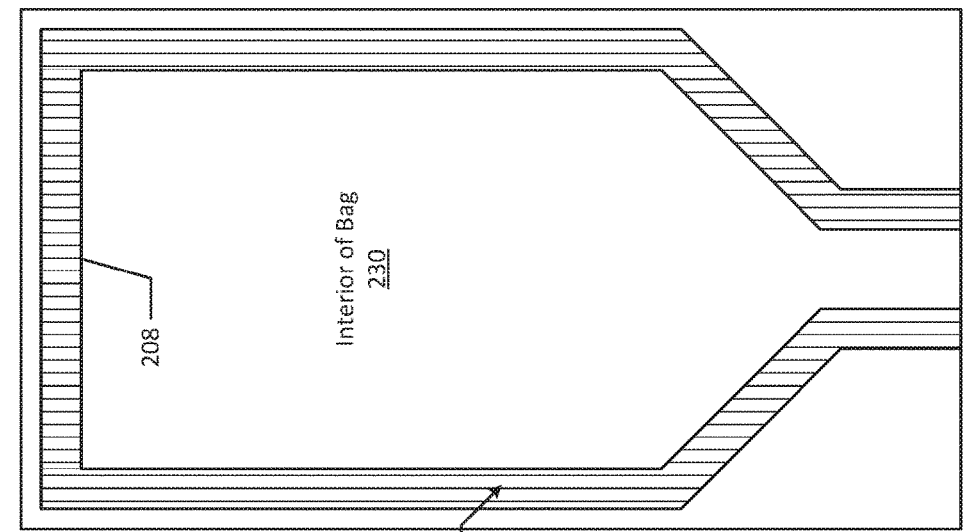
FIGS. 2A and 2B are bottom views of a seal die and a bag formed therefrom according to the present disclosure.
Figure 2A:
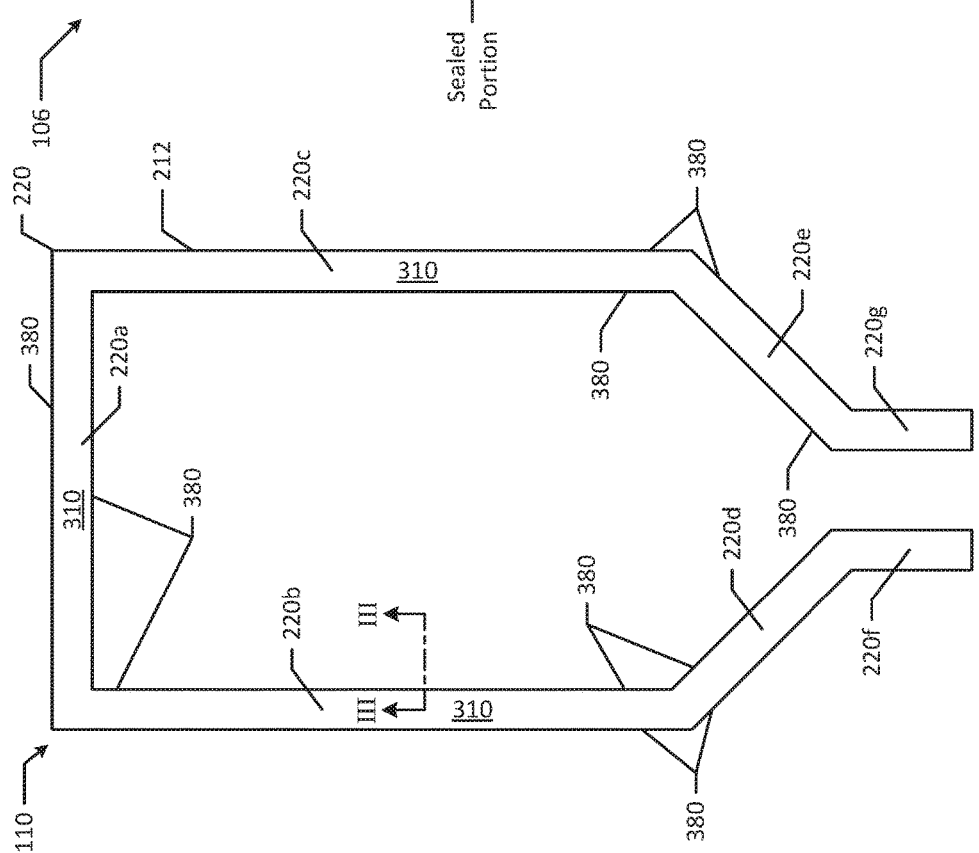

Referring now to FIGS. 2A and 2B, an example seal die 110 and resulting bag 106 are illustrated. The seal die 110 may include at least one elongated body (with sides 220a to 220g, hereafter body 220) made of a conductive material. For example, the elongated body 220 may be made from steel, stainless steel, aluminum, copper, brass, and alloys thereof. FIG. 2B illustrates that seal die 210 may seal a bag 106 having a geometry 208. Seal die 110 has a shape 212 matching and creating bag geometry 208. Seal die 110 forms the bag geometry 208 by sealing the positions of the first and second sheets 102 of material that contact die 110. In this manner, die shape 212 dictates the bag geometry 208.

As illustrated in FIG. 2B, the hatched area on bag 106 indicates the portions of the first and second sheets 102 of material that have been welded together and sealed via die 110. For larger or different shaped bag geometries 208, a corresponding larger or different seal die 110 is used. Seal die 110 may have, and thus form, rounded corners and/or sides for example. Seal die 110 may have and form a shape having any desired number of sides 220a to 220n.

Figure 3B:
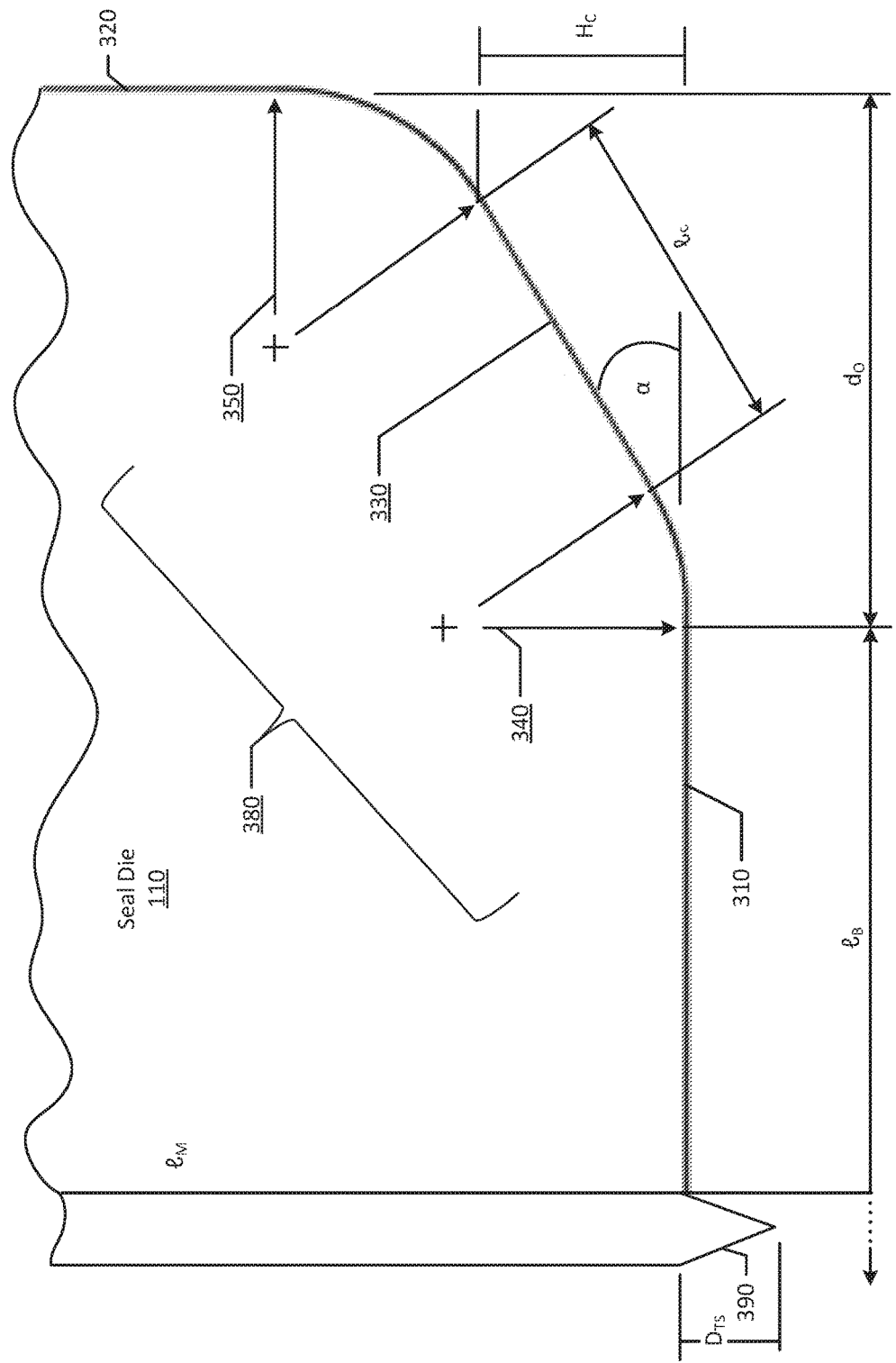
FIG. 3B is a side elevation cross-sectional view taken along line III-III of FIG. 2A showing an embodiment of a seal die with a tear seal portion according to the present disclosure.

Referring now to FIGS. 3A and 3B, in the illustrated embodiment, the die 110 includes a bottom surface 310 configured to contact first sheet 102a of material. The seal die 110 also includes an inner edge 320, a straight chamfer 330, a first blend radius ($r_1$) 340, and a second blend radius ($r_2$) 350. Straight chamfer 330 is located between the bottom surface 310 and the inner edge 320. In an example embodiment, straight chamfer 330, first blend radius 340, and second blend radius 350 form a transition region 380.

In an example embodiment, the bottom surface 310 is tangential to first blend radius 340, while inner edge 320 is tangential to the second blend radius 350. Additionally, straight chamfer 330 may be tangential to first and second blend radii 340, 350.

Straight chamfer 330 has a length ($l_c$) and is angled with respect to the bottom surface 310. Length ($l_c$) in an embodiment is the length between the two points of tangential connection to blend radii 340, 350. Angle ($\alpha$) of the straight chamfer 330 may vary depending on the welding application. For example, angle ($\alpha$) of the chamfer may have a range between 20 degrees and 40 degrees with respect to the bottom surface 320. In another example embodiment, the angle ($\alpha$) is at least 25 degrees with respect to the bottom surface 310. In another example embodiment where two seal die's are used (e.g., seal die 110a and seal die 110b) the angle ($\alpha$) of the chamfer of each seal die may be smaller. For example, angle ($\alpha$) of the chamfer may have a range between 10 degrees and 20 degrees with respect to the bottom surface 320. In another example embodiment, the angle ($\alpha$) is at least 12.5 degrees with respect to the bottom surface 310.

First blend radius ($r_1$) 340 is located between the straight chamfer 330 and the bottom surface 310. Second blend radius ($r_2$) 350 is located between the straight chamfer 330 and the inner edge 320. In an example embodiment, ($r_1$) and ($r_2$) are sized to be between 50 percent and 70 percent of the length ($l_c$) of the straight chamfer 330. In another example embodiment, ($r_1$) and ($r_2$) are at least 45 percent of the length ($l_c$). In an example, ($r_1$) and ($r_2$) may each range between 0.4 mm and 0.9 mm (0.0157 to 0.0354 inches), e.g., 0.75 mm (0.030 inches). In an example, ($r_1$) and ($r_2$) may be 0.50 mm (0.020 inches). Straight chamfer 330 causes bottom surface 310 to be offset by a specific horizontal offset distance ($d_O$) from the vertical inner edge 320. For example, the offset distance ($d_O$) may range between 0.5 mm and 2.0 mm (0.0197 to 0.0787 inches), e.g., 1.0 mm (0.0394 inches). In an example, ($d_O$) may be 1.5 mm (0.0591 inches). In another example embodiment, the offset distance ($d_O$) may depend on the length of the bottom surface ($l_B$). For example, the offset distance ($d_O$) may range between 20 percent to 80 percent of ($d_O+l_B$). In an example, ($l_B$) may range between 1.75 mm and 2.5 mm (0.0689 and 0.0984 inches), e.g., 2.15 mm (0.085 inches). In other examples, the offset distance ($d_O$), length ($l_B$), length ($l_c$), and/or radii ($r_1$) to ($r_4$) may depend on ply thickness of the material.

For purposes of illustration, FIG. 3A shows only the inner edge 320 and a portion of the bottom surface 310 of seal die 110. But, FIG. 2A shows that there is also an outer edge and the bottom surface 310 extends from inner edge 320 to the outer edge. Transition region 380 including straight chamfer 330 and radii 340, 350 may be produced accordingly between bottom surface 310 and the outer edge. FIG. 3A may therefore be thought of as half of a mirror image mirrored along a vertical line ($l_M$). Additionally, straight chamfer 330 may have a height (HC). The height (HC) may be related to the thickness of the sheets 102 of material. For example, when using two sheets of material, the height (HC) may be equal to the combined thickness of the first sheet of material 102a and the second sheet of material 102b.

In another example embodiment, the offset distance ($d_O$) and the length ($l_c$) of the straight chamfer 330 may be larger in relation to the length of the bottom surface ($l_B$) to allow for larger bead masses, for example, when using tear seal tooling. For example, seal die 110 may also include a tear seal portion 390 at vertical line ($l_M$) or at an edge of die 110 as illustrated in FIG. 3B. The tear seal portion 390 may create a perforation-like seam on the outer perimeter of the welded sheets 102. In an example, the perforation-like seam (e.g., tear seal) advantageously enables excess material to be torn off, for example, by hand. In a seal die 110 configuration with a tear seal portion 390, the displaced bead mass (e.g., seal bead 450 discussed in more detail in FIG. 4 below) increases at the chamfer side (e.g., transition region 380) of the seal die 110. In example, the offset distance ($d_O$) and the length ($l_c$) may be increased relative to bottom surface ($l_B$) to accommodate the additional bead mass. In other embodiments, that do not use tear seal tooling, offset distance ($d_O$) and length ($l_c$) of the straight chamfer 330 may be smaller in relation to the length of the bottom surface ($l_B$).

A tear seal differential ($D_{TS}$), or height of the horizontal sealing surface (e.g., bottom surface 310) relative to an adjacent tear seal portion 390, may be based on material thickness (e.g., thickness of sheets 102), material type, and/or other production parameters. The differential ($D_{TS}$) (e.g., height difference) may set a compression distance target for a given two-ply film thickness. In an example, tear seal portion 390 may extend along the entire external perimeter of seal die 110. Additionally, tear seal portion 390 may not be present on portions of seal die 110 that form an interior feature of a bag shape, such as for a hanger area or for filling eyelet areas. As discussed above, when the tear seal portion 390 is adjacent to the horizontal sealing surface (e.g., bottom surface 310), the molten material formed during the seal cycle is forced toward the interior of the bag 106 and into the chamfer section of the seal die 110. When the tear seal portion 390 is not present, the molten material may flow to either side of the seal die 110.

In an example, the tear seal differential ($D_{TS}$) may range between 0.38 mm and 0.50 mm (0.015 to 0.020 inches), e.g., 0.44 mm (0.0175 inches). Additionally, the tear seal differential ($D_{TS}$) may be proportional film thickness (e.g., thickness of a 2-ply film, such as first and second sheets 102 of material). For example, the tear seal differential ($D_{TS}$) may range between 30 percent and 80 percent of a film thickness (e.g., 2-ply film thickness), preferably between 50 percent and 70 percent. In an example, tear seal portion 390 may be used around the outside of the bag. In another example, tear seal portion 390 may be used around a bag hanger hole.

Seal die 110 may accordingly also include an outer edge, a second straight chamfer, a third blend radius ($r_3$), and a fourth blend radius ($r_4$). The second straight chamfer may be located between the bottom surface 310 and the outer edge. Third blend radius ($r_3$) may be located between the second straight chamfer and the bottom surface 310. Fourth blend radius ($r_4$) may be located between the second straight chamfer and the outer edge. Second straight chamfer, third blend radius, and fourth blend radius form a transition region, similar to or the same as transition region 380. Again, the seal die 110 may have a profile that is a mirror image of FIG. 3A along line ($l_M$).

In an example embodiment, radii ($r_3$) and ($r_4$) are sized to be between 50 percent and 70 percent of the length ($l_c$) of the straight chamfer 330. In another example embodiment, radii ($r_3$) and ($r_4$) are at least 45 percent of the length ($l_c$). Radii ($r_1$) to ($r_4$) may be the same or different. Similarly, length ($l_c$) of the straight chamfer 330 may be proportional to the arc length of the blend radius sections 340, 350 of the transition region 380. Additionally, the bottom surface 310 may have a length ($l_B$) (e.g., length between first blend radius ($r_1$) 340 and third blend radius ($r_3$)) that is between 1.0 mm and 4.0 mm (0.040 to 0.1574 inches), e.g., 3.0 mm (0.1182 inches). In an example, ($l_B$) may be 2.15 mm (0.085 inches). In other example embodiments, the length ($l_B$) may range from 0.090 inches to 0.250 inches.

In an example embodiment, the seal die 110 may include a 30 degree straight chamfer 330 bounded at each end with 0.5 mm (0.0197 inch) blend radii 340, 350, causing bottom surface 310 to be offset horizontally from the vertical inner edge 210 by 1.0 mm (0.0394 inches). Other variations of the angle, blend radii, chamfer length and/or offset may be used to transition the thermal mechanical stress of sealing two film plies in a desired manner and to adjust for film thickness.

The addition of the rounds or blend radii (e.g., blend radii 340, 350) to the straight chamfer 330 between the vertical inner edge 320 and the horizontal bottom surface 310 may act to suppress electric field concentrations. Blend radii 340, 350 may also prevent an antenna effect within the seal die 110. In an example, blend radii 340, 350 may be sized and configured to reduce local electrical field effects and prevent electric field concentrations that would otherwise exceed breakdown levels in the material (e.g., first and second sheets 102 of material).

The combination of the straight chamfer 330 and the blend radii (e.g., blend radii 340, 350) enables a gradual transition in the electric field from the horizontal bottom surface 310 to the die's inner edge 320. The more gradual field transition may act to vary a heating profile under the die 110, causing the highest heat to occur at the lowest die gap area, and to reduce the heating on the inside edge of the seal zone (discussed in more detail below). This advantageously mitigates abrupt property changes in the film that may cause fracture points between the plies 102 or within a single ply.

Figure 4A:
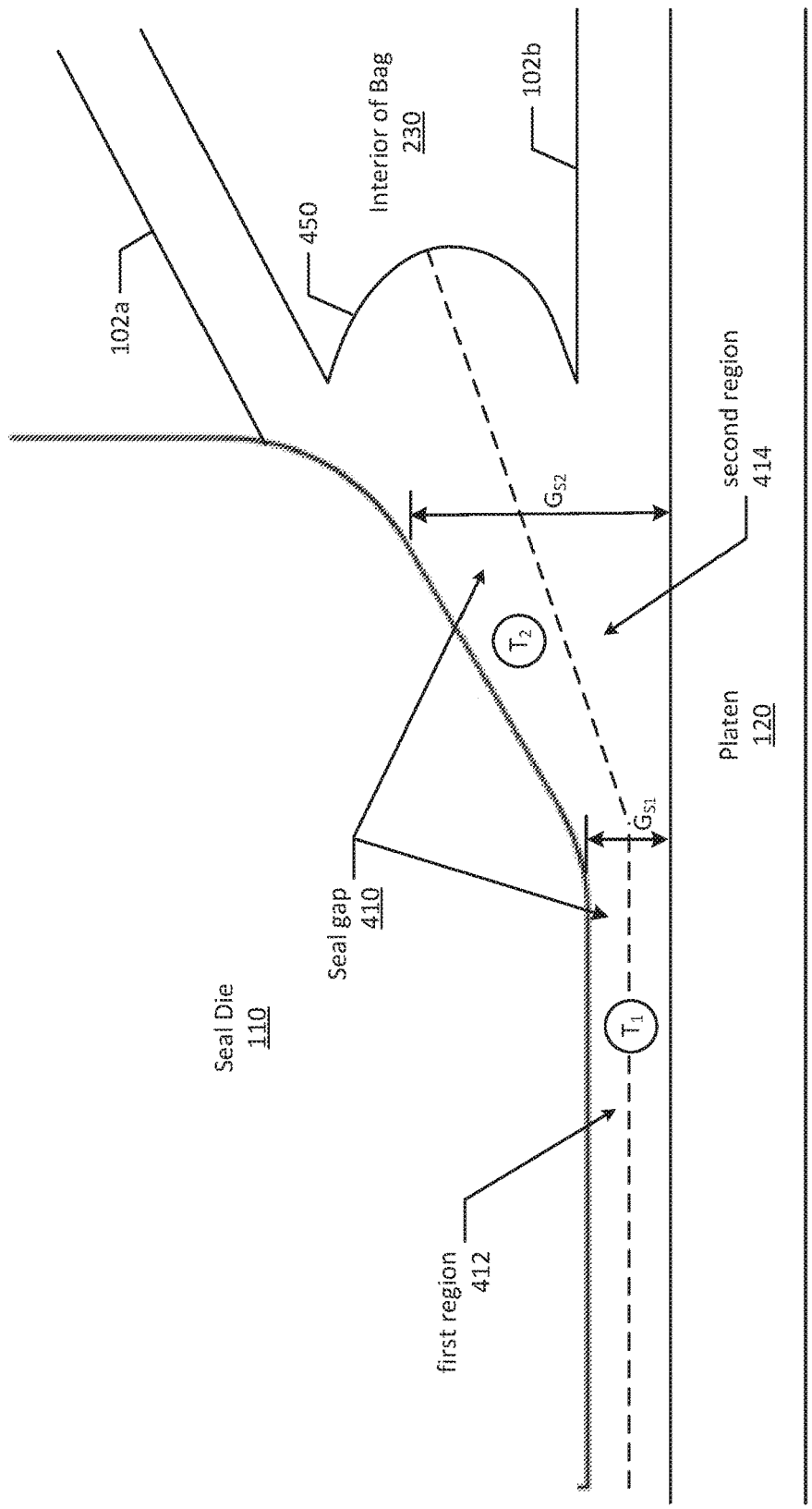
FIGS. 4A and 4B are side elevation views of an embodiment of a seal die and a lower platen of the present disclosure forming a seal showing two plastic sheets being welded together (e.g., for a bag).
Figure 4B:
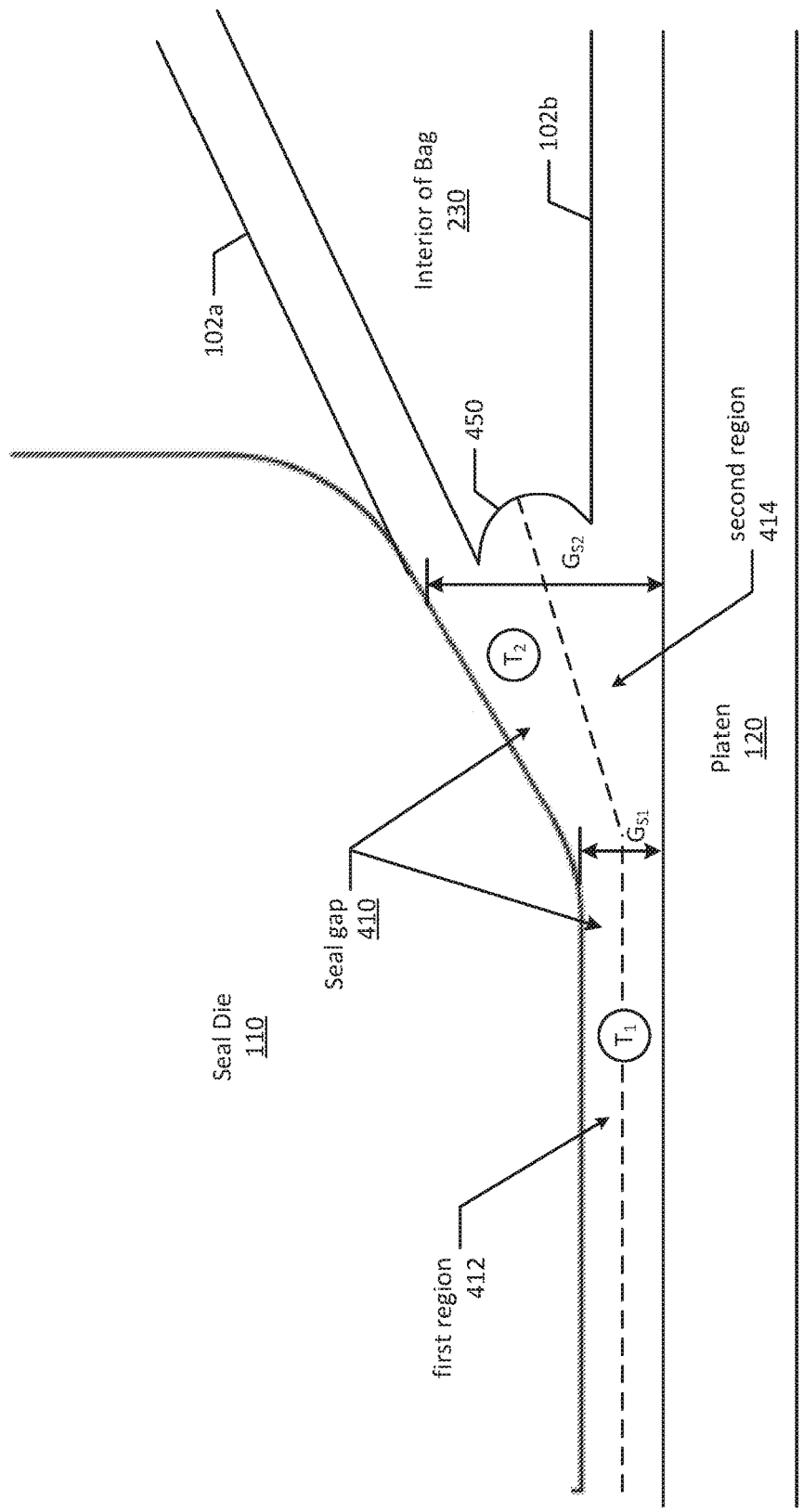

Referring now to FIGS. 4A and 4B, a side elevation view of an example seal die 110 in the process of welding first and second sheets 102 of material together is illustrated. FIGS. 4A and 4B illustrate seal die 110 compressing first and second sheets 102 of material together between the seal die 110 and the platen 120. Seal die 110, as discussed above, imparts thermal energy to the first and second sheets 102 of material, thereby welding the first and second sheets 102 of material together. In an example embodiment, control unit 130, via linear actuator 170, is programmed to position seal die 110 with respect to platen 120, so as to create a seal gap 410 between the seal die 110 and the platen 120. Seal gap 410 includes a first region 412 and a second region 414. First region 412 has an at least substantially constant distance ($G_{S1}$) between the bottom surface 310 of the seal die 110 and the platen 120. Second region 414 has an increasing distance ($G_{S2}$) between the transition region 380 and the platen 120. Second region 414 extends between the seal die 110 and the platen 120 in the region between first blend radius 340 and second blend radius 350 (e.g., transition region 380). Region 414 distance ($G_{S2}$) at its largest point may be 300 percent larger than region 412 distance ($G_{S1}$).

In another example embodiment, seal bead 450 may be beneath seal die 110. Additionally, ($G_{S1}$) may be have a distance that is 30 percent of the width of the two ply material and ($G_{S2}$) may have a distance that is 120 percent of the thickness of the 2 ply material.

The combination of the straight chamfer 330, the first blend radius 340, and the second blend radius 350 forming transition region 380 enables more molten material (e.g., material that melted from first and second sheets 102) to remain under compression in seal gap 410. A resulting heating profile includes a first temperature ($T_1$) in first region 412 and a second temperature ($T_2$) in second region 414. First temperature ($T_1$) will typically be higher than the second temperature ($T_2$).

Additionally, the combination of straight chamfer 330, first blend radius 340, and second blend radius 350 may enable a gradual transition in the electric field from the horizontal bottom surface 310 to the die's inner edge 320 by reducing electric field concentration effects associated with sharp geometry changes. The gradual transition in the electric field may act to vary the heating profile beneath the seal die 110, ensuring the highest temperatures of the profile throughout first region 412 and continuously reducing temperatures of the profile throughout second region 414 as the distance ($G_{S2}$) between the transition region 380 and the platen 120 increases. The varied heating profile may advantageously mitigate abrupt property changes in the film, which may reduce ply fracture points, thereby decreasing the number of bag defects.

The combination of straight chamfer 330 and blend radii 340, 350 forming transition region 380 is also advantageous because providing instead only a radius at the die edge would require a large radius, which would necessitate large, heavy, expensive and less RF efficient electrodes. Transition region 380 also advantageously enables more of the molten material to remain under compression beneath seal die 110. Transition region 380 controls compression of the molten material mass to provide better cohesion and robustness between the plies 102. The combination of straight chamfer 330 and blend radii 340, 350 also advantageously reduces the bead mass, which may limit potential for stress risers due to malformed beads. The transition of compression under the transition region 380 enables the seal die 110 to impart the necessary electric field and pressure to sheets 102 to ensure seal interface cohesiveness under the horizontal bottom surface 310 and full film strength at the inner edge 320 of seal die 110.

FIG. 4 illustrates that molten material forms a seal bead 450 that progressively decreases temperature as it extends from first region 412 through the second region 414 towards the interior of the bag 230. The profile of the seal die 110 advantageously enables the seal bead 450 to extend between first region 412 and second region 414 without damaging an inner skin of the unsealed film, therefore maintaining strength at the seal's edge. For example, the seal die 110 improves the bead seal between the plies 102 of material to provide additional container strength (e.g., increased drop test resistance). The compression under the transition region 380 and the path of the seal bead 450 advantageously accommodates for film and seal thickness imperfections while maintaining adequate seal properties. For example, sealed cross-sections, prepared according to the present disclosure, analyzed under a polarized light show a more distributed heat signature across the bead and the plies than with traditional rounded seal dies (e.g., radius only).

Figure 5:
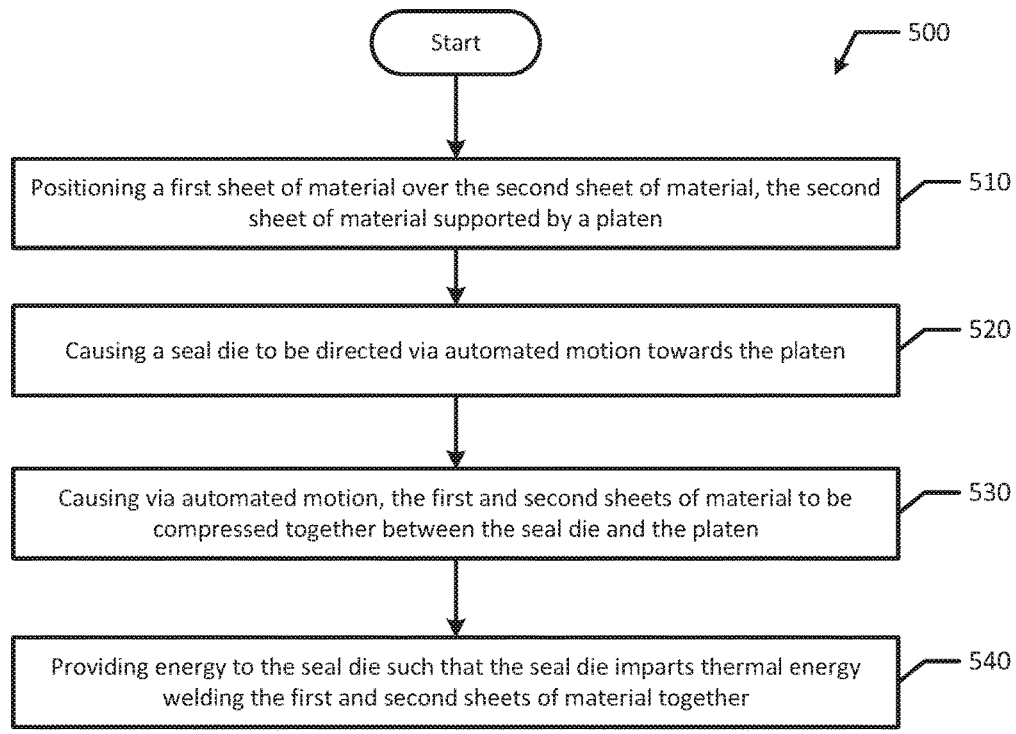
FIG. 5 is a flow chart of an example process for welding first and second sheets of material together to form a structure (e.g., a bag).

FIG. 5 illustrates a flowchart of an example method 500 for welding first and second sheets of material together to form a structure (e.g., a bag) in accordance with an example embodiment of the present disclosure. Although the example method 500 is described with reference to the flowchart illustrated in FIG. 5, it will be appreciated that many other methods of performing the acts associated with the method 500 may be used. For example, the order of some of the blocks may be changed, certain blocks may be combined with other blocks, and some of the blocks described are optional. The method 500 may be performed by processing logic that may include hardware (circuitry, dedicated logic, etc.), software, or a combination of both.

The example method 500 includes positioning a first sheet 102a of material over a second sheet 102b of material where the second sheet 102b of material is supported by a platen 120 (block 510). For example, first sheet 102a of material may be positioned over second sheet of material 102b by roller drive 180. Then, example method 500 includes causing a seal die 110 to be directed via automated motion towards platen 120 (block 520). Seal die 110 includes a bottom surface 310 configured to contact the first sheet of material 102b. Additionally, seal die 110 includes an inner edge 320, a straight chamfer 330 located between the bottom surface 310 and the inner edge 320. Straight chamfer 330 has a length ($l_c$) and forms an angle with respect to the bottom surface 310, a first blend radius ($r_1$) 340 located between the straight chamfer 330 and the bottom surface 310, and a second blend radius ($r_2$) 350 located between the straight chamfer 330 and the inner edge 320. In an example, ($r_1$) and ($r_2$) are each sized to be at least 45 percent of length ($l_c$). Further, example method 500 includes causing via automated motion, the first and second sheets 102 of material to be compressed together between seal die 110 and platen 120 (block 530). For example, linear actuator 170 under control of control unit 130 may drive the seal die 110 down onto the platen 120 to compress first and second sheets 102 of material together. Then, example method 500 includes providing energy to seal die 110 such that seal die 110 imparts thermal energy welding first and second sheets 102 of material together (block 540). For example, control unit 130 may control switch 150 and power source 140 to provide RF energy or thermal energy to the seal die 110, which melts the first and second sheets 102 of material together at locations that are in contact with the seal die 110.

Figure 6:
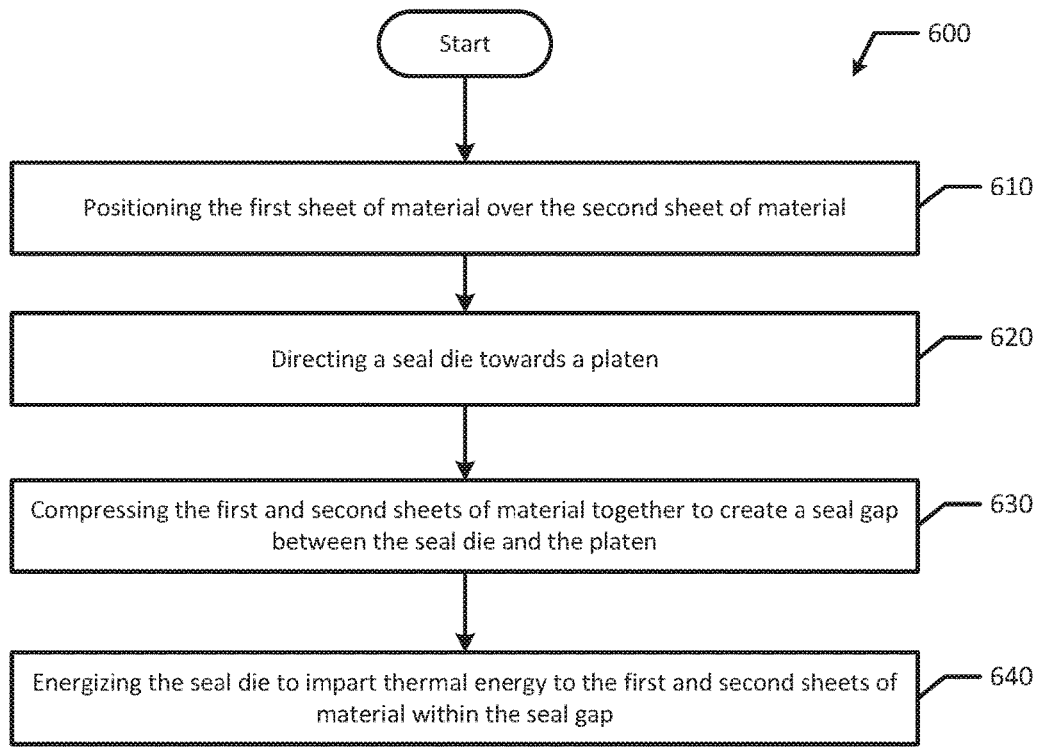
FIG. 6 is a flow chart of an example process for welding first and second sheets of material together to form a structure (e.g., a bag).

FIG. 6 illustrates a flowchart of an example method 600 for welding first and second sheets of material together to form a structure (e.g., a bag) in accordance with an example embodiment of the present disclosure. Although the example method 600 is described with reference to the flowchart illustrated in FIG. 6, it will be appreciated that many other methods of performing the acts associated with the method 600 may be used. For example, the order of some of the blocks may be changed, certain blocks may be combined with other blocks, and some of the blocks described are optional. The method 600 may be performed by processing logic that may include hardware (circuitry, dedicated logic, etc.), software, or a combination of both.

The example method 600 includes positioning a first sheet of material over a second sheet of material (block 610). For example, first sheet 102a of material may be positioned over second sheet of material 102b by roller drive 180. Then, example method 600 includes directing seal die 110 towards platen 120 (block 620). For example, control unit 130 may be programmed with multiple selectable programs to cause the seal die 110 to be directed towards the platen 120, which supports second sheet of material 102b, in a desired manner. Further, example method 600 includes compressing first and second sheets 102 of material together to create a seal gap 410 between seal die 110 and platen 120 (block 630). The seal gap 410 includes a includes a first region 412 and a second region 414. First region 412 has an at least substantially constant distance ($G_{S1}$) between the bottom surface 310 of seal die 110 and platen 120. Second region 414 has an increasing distance ($G_{S2}$) between the transition region 380 and the platen 120. Then, example method 600 includes energizing seal die 110 to impart thermal energy to first and second sheets 102 of material within seal gap 410 (block 640). For example, control unit 130 may control switch 150 and power source 140 to provide RF energy or thermal energy to the seal die 110, which melts the first and second sheets 102 of material together at locations that are in contact with the seal die 110.

Energizing seal die 110 may create an electric field in the first and second sheets 102 of material and the first and second sheets 102 of material may vibrate in response to the electric field (e.g., AC field). For example, the first and second sheets 102 of material may be constructed of polar materials that vibrate in response to the AC field. These vibrations generate heat within the materials and induce a temperature change therein. The seal die 110 thus advantageously enables first and second sheets 102 of material to create their own heat in response to the electric field such that the sheets 102 of material melt at the material interface rather than the die-material interface. In another example, seal die 110 may be heated to transmit thermal energy to the first and second sheets 102 of material.

In an example, a second seal die may be used instead of platen 120. For example, method 500 and/or method 600 may use a top seal die (e.g., seal die 111) and a bottom seal die. Top seal die (e.g., seal die 110) and bottom seal die may be directed towards each other to compress first and second sheets 102 of material together during the sealing process. In an example, a buffer material may be used to aid in transportation and/or support of sheets 102. In another example, sheets 102 may be compressed and sealed without using a buffer material.

Aspects of the subject matter described herein may be useful alone or in combination with any one or more of the other aspects described herein. Without limiting the foregoing description, in an exemplary aspect of the present disclosure, a structure formed via first and second sheets of material welded together via a method that includes positioning the first sheet of material over the second sheet of material and causing a seal die to be directed via automated motion towards the surface. The second sheet of material supported by a surface, and the seal die includes a bottom surface configured to contact the first sheet of material, an inner edge, a straight chamfer located between the bottom surface and the inner edge, a first blend radius ($r_1$) located between the straight chamfer and the bottom surface, and a second blend radius ($r_2$) located between the straight chamfer and the inner edge. The straight chamfer has a length ($l_c$) and forms an angle with respect to the bottom surface, and ($r_1$) and ($r_2$) are each sized to be at least 45 percent of length ($l_c$). The method also includes causing via automated motion, the first and second sheets of material to be compressed together between the seal die and the surface, and providing energy to the seal die such that the seal die imparts thermal energy welding the first and second sheets of material together.

In accordance with another exemplary aspect of the present disclosure, which may be used in combination with the preceding aspect, the surface is one of a platen or a bottom seal die.

In accordance with another exemplary aspect of the present disclosure, which may be used in combination with any one or more of the preceding aspects, the length ($l_c$) of the straight chamfer is between 0.6 mm and 2.0 mm, the length of the bottom surface is between 2.0 mm and 4.0 mm, and the angle of the straight chamfer is at least 25 degrees.

In accordance with another exemplary aspect of the present disclosure, which may be used in combination with any one or more of the preceding aspects, ($r_1$) is equal to ($r_2$).

In accordance with another exemplary aspect of the present disclosure, which may be used in combination with any one or more of the preceding aspects, the structure is a flexible fluid container.

In accordance with another exemplary aspect of the present disclosure, which may be used in combination with any one or more of the preceding aspects, a structure formed via first and second sheets of material welded together via a method that includes positioning the first sheet of material over the second sheet of material and directing a seal die towards a surface. The surface supports the second sheet of material, and the seal die includes a bottom surface configured to contact the first sheet of material, an inner edge, a straight chamfer extending between the bottom surface and the inner edge, a first blend radius extending between the straight chamfer and the bottom surface, and a second blend radius extending between the straight chamfer and the inner edge. The straight chamfer has an orientation angle with respect to the bottom surface. The method also includes compressing the first and second sheets of material together to create a seal gap between the seal die and the surface. The seal gap include a first region having a constant distance between the bottom surface of the seal die and the surface and a second region having an increasing distance between the chamfer and the surface due to the straight chamfer and the first and second blend radii. Additionally, the method includes energizing the seal die to impart thermal energy to the first and second sheets of material within the seal gap.

In accordance with another exemplary aspect of the present disclosure, which may be used in combination with any one or more of the preceding aspects, the surface is one of a platen or a bottom seal die.

In accordance with another exemplary aspect of the present disclosure, which may be used in combination with any one or more of the preceding aspects, the straight chamfer, the first blend radius, and the second blend radius form a transition region. The transition region is configured to vary a heating profile within the second region of the seal gap, and the heating profile results in a first temperature at the first region and a second temperature at the second region.

In accordance with another exemplary aspect of the present disclosure, which may be used in combination with any one or more of the preceding aspects, a welding apparatus for welding first and second sheets of material together, the apparatus includes a seal die made of a conductive material configured to impart thermal-mechanical energy to the first and second sheets of material. The seal die includes a bottom surface configured to contact the first sheet of material, an inner edge, a straight chamfer extending between the bottom surface and the inner edge, a first blend radius extending between the straight chamfer and the bottom surface, and a second blend radius extending between the straight chamfer and the inner edge. The straight chamfer has an orientation angle with respect to the bottom surface. The apparatus also includes a surface configured to support the second sheet of material, a control unit programmed to cause the seal die to be directed towards the surface such that the seal die compresses the first and second sheets of material together between the seal die and the surface, and a power source adapted to provide energy to the seal die such that the seal die imparts thermal energy welding the first and second sheets of material together.

In accordance with another exemplary aspect of the present disclosure, which may be used in combination with any one or more of the preceding aspects, the surface is one of a platen or a bottom seal die.

In accordance with another exemplary aspect of the present disclosure, which may be used in combination with any one or more of the preceding aspects, the energy is RF energy.

In accordance with another exemplary aspect of the present disclosure, which may be used in combination with any one or more of the preceding aspects, the seal die includes a tear seal portion configured to create a perforation-like seam on the first and second welded sheets of material.

In accordance with another exemplary aspect of the present disclosure, which may be used in combination with any one or more of the preceding aspects, the control unit is programmed to position the seal die so as to create a seal gap between the seal die and the surface. The seal gap includes a first region with a constant distance between the bottom surface of the seal die and the surface and a second region with an increasing distance between the chamfer and the surface.

In accordance with another exemplary aspect of the present disclosure, which may be used in combination with any one or more of the preceding aspects, the first and second sheets of material form a molten material within the seal gap.

In accordance with another exemplary aspect of the present disclosure, which may be used in combination with any one or more of the preceding aspects, the straight chamfer, the first blend radius, and the second blend radius form a transition region. The transition region is configured to vary a heating profile within the seal gap, and the heating profile results in a first temperature at the first region and a second temperature at the second region. Additionally, the first temperature is greater than the second temperature.

In accordance with another exemplary aspect of the present disclosure, which may be used in combination with any one or more of the preceding aspects, the transition region is configured to enable a gradual transition in the electrical field from the bottom surface to the inner edge of the seal die.

In accordance with another exemplary aspect of the present disclosure, which may be used in combination with any one or more of the preceding aspects, the straight chamfer is configured to allow the molten material to remain under compression in the seal gap beneath the straight chamfer.

In accordance with another exemplary aspect of the present disclosure, which may be used in combination with any one or more of the preceding aspects, the seal die is formed with a shape associated with a desired bag geometry.

In accordance with another exemplary aspect of the present disclosure, which may be used in combination with any one or more of the preceding aspects, the first blend radius and the second blend radius of the seal die are configured to suppress electric field concentrations in the seal die.

In accordance with another exemplary aspect of the present disclosure, which may be used in combination with any one or more of the preceding aspects, the first blend radius and the second blend radius of the seal die are configured to prevent an antenna effect within the seal die.

In accordance with another exemplary aspect of the present disclosure, which may be used in combination with any one or more of the preceding aspects, the first blend radius ($r_1$) and the second blend radius ($r_2$) are at least 45 percent of the length of the straight chamfer.

In accordance with another exemplary aspect of the present disclosure, which may be used in combination with any one or more of the preceding aspects, an electrically conductive seal die for use in an apparatus for welding first and second sheets of material together, the seal die includes a bottom surface configured to contact the first sheet of material, an inner edge, a straight chamfer located between the bottom surface and the inner edge, a first blend radius ($r_1$) located between the straight chamfer and the bottom surface, and a second blend radius ($r_2$) located between the straight chamfer and the inner edge. The straight chamfer has a length ($l_c$) and forms an angle with respect to the bottom surface. Additionally, ($r_1$) and ($r_2$) are each sized to be at least 45 percent of length ($l_c$).

In accordance with another exemplary aspect of the present disclosure, which may be used in combination with any one or more of the preceding aspects, the seal die is for sealing a flexible fluid container having a geometry, and the seal die has a shape associated with the geometry.

In accordance with another exemplary aspect of the present disclosure, which may be used in combination with any one or more of the preceding aspects, the first blend radius ($r_1$) and the second blend radius ($r_2$) of the seal die are configured to suppress electric field concentrations in the seal die, and the first blend radius ($r_1$) and the second blend radius ($r_2$) of the seal die are configured to prevent an antenna effect within the seal die.

In accordance with another exemplary aspect of the present disclosure, which may be used in combination with any one or more of the preceding aspects, the length ($l_c$) of the straight chamfer is between 0.6 mm and 1.0 mm, the length of the bottom surface is between 2 mm and 4 mm, and the angle of the straight chamfer is at least 25 degrees.

In accordance with another exemplary aspect of the present disclosure, which may be used in combination with any one or more of the preceding aspects, ($r_1$) is equal to ($r_2$).

In accordance with another exemplary aspect of the present disclosure, which may be used in combination with any one or more of the preceding aspects, further includes an outer edge. The straight chamfer is a first straight chamfer. The seal die includes a second straight chamfer located between the bottom surface and the outer edge, a third blend radius ($r_3$) located between the second straight chamfer and the bottom surface, and a fourth blend radius ($r_4$) located between the second straight chamfer and the outer edge.

In accordance with another exemplary aspect of the present disclosure, which may be used in combination with any one or more of the preceding aspects, the third blend radius and the fourth blend radius are each sized to be at least 45 percent of a length of the second straight chamfer.

The many features and advantages of the present disclosure are apparent from the written description, and thus, the appended claims are intended to cover all such features and advantages of the disclosure. Further, since numerous modifications and changes will readily occur to those skilled in the art, the present disclosure is not limited to the exact construction and operation as illustrated and described. Therefore, the described embodiments should be taken as illustrative and not restrictive, and the disclosure should not be limited to the details given herein but should be defined by the following claims and their full scope of equivalents, whether foreseeable or unforeseeable now or in the future.

The invention claimed as follows:

1. A structure formed via first and second sheets of material welded together via a method comprising:

positioning the first sheet of material over the second sheet of material, the second sheet of material supported by a surface;

causing a seal die to be directed via automated motion towards the surface, wherein the seal die includes a bottom surface configured to contact the first sheet of material, an inner edge, a straight chamfer located between the bottom surface and the inner edge, the straight chamfer having a length ($l_c$) and forming an angle with respect to the bottom surface, a first blend radius ($r_1$) located between the straight chamfer and the bottom surface, and a second blend radius ($r_2$) located between the straight chamfer and the inner edge, wherein ($r_1$) and ($r_2$) are each sized to be at least 45 percent of length ($l_c$);

causing via automated motion, the first and second sheets of material to be compressed together between the seal die and the surface; and providing energy to the seal die such that the seal die imparts thermal energy welding the first and second sheets of material together.

2. The structure of claim 1, wherein in the method the surface is one of a platen or a bottom seal die.

3. The structure of claim 1, wherein in the method the length ($l_c$) of the straight chamfer is between 0.6 mm and 2.0 mm, the length of the bottom surface is between 2.0 mm and 4.0 mm, and the angle of the straight chamfer is at least 25 degrees.

4. The structure of claim 1, wherein in the method ($r_1$) is equal to ($r_2$).

5. The structure of claim 1, wherein the structure is a flexible fluid container.

6. A structure formed via first and second sheets of material welded together via a method comprising:

positioning the first sheet of material over the second sheet of material;

directing a seal die towards a surface, the surface supporting the second sheet of material, and wherein the seal die includes a bottom surface configured to contact the first sheet of material, an inner edge, a straight chamfer extending between the bottom surface and the inner edge, wherein the straight chamfer has an orientation angle with respect to the bottom surface, a first blend radius extending between the straight chamfer and the bottom surface, and a second blend radius extending between the straight chamfer and the inner edge;

compressing the first and second sheets of material together to create a seal gap between the seal die and the surface, wherein the seal gap include a first region having a constant distance between the bottom surface of the seal die and the surface and a second region having an increasing distance between the chamfer and the surface due to the straight chamfer and the first and second blend radii; and energizing the seal die to impart thermal energy to the first and second sheets of material within the seal gap.

7. The structure of claim 6, wherein in the method the surface is one of a platen or a bottom seal die.

8. The structure of claim 6, wherein the straight chamfer, the first blend radius, and the second blend radius form a transition region, the transition region configured to vary a heating profile within the second region of the seal gap, the heating profile resulting in a first temperature at the first region and a second temperature at the second region.

9. A welding apparatus for welding first and second sheets of material together, the apparatus comprising:

a seal die made of a conductive material configured to impart thermal-mechanical energy to the first and second sheets of material, wherein the seal die includes
a bottom surface configured to contact the first sheet of material,
an inner edge,
a straight chamfer extending between the bottom surface and the inner edge, wherein the straight chamfer has an orientation angle with respect to the bottom surface,
a first blend radius extending between the straight chamfer and the bottom surface, and
a second blend radius extending between the straight chamfer and the inner edge;
a surface configured to support the second sheet of material;
a control unit programmed to cause the seal die to be directed towards the surface such that the seal die compresses the first and second sheets of material together between the seal die and the surface; and
a power source adapted to provide energy to the seal die such that the seal die imparts thermal energy welding the first and second sheets of material together.

10. The welding apparatus of claim 9, wherein the surface is one of a platen or a bottom seal die.

11. The welding apparatus of claim 9, wherein the energy is RF energy.

12. The welding apparatus of claim 9, wherein the seal die includes a tear seal portion configured to create a perforation-like seam on the first and second welded sheets of material.

13. The welding apparatus of claim 9, wherein the seal die is formed with a shape associated with a desired bag geometry.

14. The welding apparatus of claim 9, wherein the first blend radius and the second blend radius of the seal die are configured to suppress electric field concentrations in the seal die.

15. The welding apparatus of claim 9, wherein the first blend radius and the second blend radius of the seal die are configured to prevent an antenna effect within the seal die.

16. The welding apparatus of claim 9, wherein the first blend radius ($r_1$) and the second blend radius ($r_2$) are at least 45 percent of the length of the straight chamfer.

17. The welding apparatus of claim 9, wherein the control unit is programmed to position the seal die so as to create a seal gap between the seal die and the surface, the seal gap including a first region having a constant distance between the bottom surface of the seal die and the surface and a second region having an increasing distance between the chamfer and the surface.

18. The welding apparatus of claim 17, wherein the first and second sheets of material form a molten material within the seal gap.

19. The welding apparatus of claim 17, wherein the straight chamfer, the first blend radius, and the second blend radius form a transition region, the transition region configured to vary a heating profile within the seal gap, the heating profile resulting in a first temperature at the first region and a second temperature at the second region, and wherein the first temperature is greater than the second temperature.

20. The welding apparatus of claim 19, wherein the transition region is configured to enable a gradual transition in the electrical field from the bottom surface to the inner edge of the seal die.

21. The welding apparatus of claim 20, wherein the straight chamfer is configured to allow the molten material to remain under compression in the seal gap beneath the straight chamfer.

22. An electrically conductive seal die for use in an apparatus for welding first and second sheets of material together, the seal die comprising:
a bottom surface configured to contact the first sheet of material;
an inner edge;
a straight chamfer located between the bottom surface and the inner edge, wherein the straight chamfer has a length ($l_c$) and forms an angle with respect to the bottom surface;
a first blend radius ($r_1$) located between the straight chamfer and the bottom surface; and
a second blend radius ($r_2$) located between the straight chamfer and the inner edge, wherein ($r_1$) and ($r_2$) are each sized to be at least 45 percent of length ($l_c$).

23. The seal die of claim 22, wherein the seal die is for sealing a flexible fluid container having a geometry, and wherein the seal die has a shape associated with the geometry.

24. The seal die of claim 22, wherein the first blend radius ($r_1$) and the second blend radius ($r_2$) of the seal die are configured to suppress electric field concentrations in the seal die, and wherein the first blend radius ($r_1$) and the second blend radius ($r_2$) of the seal die are configured to prevent an antenna effect within the seal die.

25. The seal die of claim 22, wherein the length ($l_c$) of the straight chamfer is between 0.6 mm and 1.0 mm, the length of the bottom surface is between 2 mm and 4 mm, and the angle of the straight chamfer is at least 25 degrees.

26. The seal die of claim 22, wherein ($r_1$) is equal to ($r_2$).

27. The seal die of claim 22, which includes an outer edge, the straight chamfer a first straight chamfer, and which includes a second straight chamfer located between the bottom surface and the outer edge, a third blend radius ($r_3$) located between the second straight chamfer and the bottom surface, and a fourth blend radius ($r_4$) located between the second straight chamfer and the outer edge.

28. The seal die of claim 27, wherein the third blend radius and the fourth blend radius are each sized to be at least 45 percent of a length of the second straight chamfer.

* * * * *